(12) United States Patent
Mori et al.

(10) Patent No.: US 10,189,051 B2
(45) Date of Patent: Jan. 29, 2019

(54) VIBRATION MOTOR AND METHOD OF MANUFACTURING THE SAME

(71) Applicant: Nidec Seimitsu Corporation, Ueda-shi, Nagano-ken (JP)

(72) Inventors: Zendi Mori, Ueda (JP); Takayuki Takeuchi, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 117 days.

(21) Appl. No.: 14/959,146

(22) Filed: Dec. 4, 2015

(65) Prior Publication Data

US 2016/0243589 A1 Aug. 25, 2016

(30) Foreign Application Priority Data

Feb. 19, 2015 (JP) .................................. 2015-030195

(51) Int. Cl.
*B06B 1/04* (2006.01)
*H02K 33/18* (2006.01)
(Continued)

(52) U.S. Cl.
CPC .............. *B06B 1/045* (2013.01); *H02K 33/18* (2013.01); *H02K 33/02* (2013.01)

(58) Field of Classification Search
CPC ........ B06B 1/045; H02K 33/18; H02K 33/02; H02K 35/04; H02K 41/02; H02K 41/031
(Continued)

(56) References Cited

U.S. PATENT DOCUMENTS 4,677,335 A * 6/1987 Ueda ........................ H02K 5/18
310/268
5,677,587 A * 10/1997 Sakashita ............. H02K 1/2786
310/154.28
(Continued)

FOREIGN PATENT DOCUMENTS

CN 103683791 A 3/2014
FR 1008651 A * 5/1952 .............. G01M 7/04
(Continued)

OTHER PUBLICATIONS

Gregoire (FR 1008651 A) English Translation.*
(KR 101451871 B1) English Translation.*
Lee (KR 20120097309 A) English Translation.*

*Primary Examiner* — Quyen P Leung
*Assistant Examiner* — Robert E Mates
(74) *Attorney, Agent, or Firm* — Keating & Bennett, LLP

(57) ABSTRACT

In an exemplary preferred embodiment of the present disclosure, a vibration motor comprises a base portion, a magnet, and a vibrator portion, a cover portion, and an elastic member. The base portion expands perpendicular to a vertical center axis. The magnet is a single member which is fixed to an upper side of the base portion in the vertical direction. The vibrator portion is disposed around the magnet and vibrates in a vertical direction. The cover portion covers upper and side portions of the magnet and the vibrator portion. The cover portion is fixed to the base portion. The elastic member is disposed between an upper inner surface of the cover portion and a top portion of the vibrator portion. The vibrator portion includes a coil portion and a mass portion. The coil portion faces the magnet in a radial direction. The mass portion is fixed to the coil portion. The magnet includes a plurality of magnetic pole pairs and a non-magnetic portion. The plurality of magnetic pole pairs are arranged in the vertical direction. Each of the plurality of (Continued)

magnetic pole pairs has two vertically adjacent magnetic poles having different polarity from each other. The non-magnetic portion is disposed between each of the plurality of magnetic pole pairs in the vertical direction. The polarity of two magnetic poles on both sides vertically adjacent to the non-magnetic portion is identical.

13 Claims, 17 Drawing Sheets

(51) Int. Cl.
  *H02K 41/03* (2006.01)
  *H02K 33/02* (2006.01)
(58) Field of Classification Search
  USPC .................. 310/30, 23, 12.24, 192, 34, 35
  See application file for complete search history.

(56) References Cited

U.S. PATENT DOCUMENTS

| | | | |
|---|---|---|---|
| 6,194,796 B1 * | 2/2001 | Yeakley | H02K 41/0356 310/12.16 |
| 6,600,399 B1 * | 7/2003 | Trandafir | H01F 7/066 335/222 |
| 8,669,679 B2 | 3/2014 | Lee et al. | |
| 8,952,580 B2 | 2/2015 | Kim | |
| 2012/0080959 A1 | 4/2012 | Oh et al. | |
| 2012/0169150 A1 | 7/2012 | Lee et al. | |
| 2012/0280579 A1 * | 11/2012 | Carlmark | H02K 41/031 310/12.24 |
| 2013/0088100 A1 * | 4/2013 | Lee | H02K 33/18 310/25 |
| 2013/0113305 A1 | 5/2013 | Choi | |
| 2014/0070633 A1 | 3/2014 | Kim | |

FOREIGN PATENT DOCUMENTS

| | | | |
|---|---|---|---|
| JP | 2004-073983 A | | 3/2004 |
| JP | 2004-320827 A | | 11/2004 |
| JP | 2013-085438 A | | 5/2013 |
| KR | 10-2012-0035094 A | | 4/2012 |
| KR | 20120097309 A | * | 9/2012 |
| KR | 10-2013-0028600 A | | 3/2013 |
| KR | 10-2014-0059324 A | | 5/2014 |
| KR | 101451871 B1 | * | 10/2014 |

\* cited by examiner

VIBRATION MOTOR AND METHOD OF MANUFACTURING THE SAME

BACKGROUND OF THE INVENTION

1. Field of the Invention

The present disclosure relates to a vibration motor and a method of manufacturing the vibration motor.

2. Description of the Related Art

In recent years, for a silent notification device of mobile communication equipment and the like, or for other purposes, a vibration motor which makes a vibrator portion vibrate in a vertical direction by an interaction of a coil and a magnet which are disposed in a radial direction, has been in use. In the vibration motor disclosed in Japanese Patent Application Publication No. 2013-85438 and US Patent Application Publication No. 2012/0169150, two magnets are separately disposed in a vertical direction, such that their magnetic poles having the same polarity face each other. Accordingly, a vibration force of the vibration motor increases, when compared to a case in which a single magnet is used.

Meanwhile, in the magnet for a reciprocating motion device disclosed in Japanese Patent Application Publication No. 2004-320827, three or more poles in odd number are formed on a lateral surface of the magnet having a cylindrical shape. On the lateral surface of the magnet, an N-pole is provided to a longitudinal center portion, and an S-pole is provided to both end portions.

SUMMARY OF THE INVENTION

However, in the vibration motor disclosed in Japanese Patent Application Publication No. 2013-85438 and US Patent Application Publication No. 2012/0169150, two magnets are used, so that the number of components of the vibration motor is increased. Further, since the two magnets need to be fixed respectively, the number of manufacturing processes of the vibration motor is increased. Further, because the magnetic poles of the same polarity in the two magnets face each other, there is a possibility that dislocation of the magnets may occur by magnetic repulsive force between the magnetic poles when they are disposed.

In the magnet for the reciprocating motion device of Japanese Patent Application Publication No. 2004-320827, since an odd number of poles are magnetized on the lateral surface by one magnetizing magnet, a magnetic flux loop, which occurs from the center portion of the lateral surface of the magnet toward a radially outer side, gets smaller. Therefore, if the magnet is used in the vibration motor, there is a possibility that an amount of the magnetic flux which vertically passes through a coil is reduced, so that the vibration force may be weakened.

Therefore, the structure and manufacturing process of the vibration motor are required to be simplified.

One preferred embodiment of the present disclosure is a vibration motor which comprises a base portion which expands perpendicular to a vertical center axis, a magnet which is a single member fixed to an upper side of the base portion to extend in a vertical direction, a vibrator portion which is disposed around the magnet and vibrates in a vertical direction, a cover portion which is fixed to the base portion and covers upper and side portions of the magnet and the vibrator portion, and an elastic member which is disposed between an upper inner surface of the cover portion and a top portion of the vibrator portion, wherein the vibrator portion includes a coil portion which faces the magnet in a radial direction, and a mass portion which is fixed to the coil portion, and the magnet includes a plurality of magnetic pole pairs which are arranged in the vertical direction and each of which has two vertically adjacent magnetic poles having different polarity from each other, and a non-magnetic portion which is disposed between each of the plurality of magnetic pole pairs in the vertical direction and in which the polarity of two magnetic poles on both sides vertically adjacent to the non-magnetic portion is identical.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 is a drawing which illustrates a section in the process flow for manufacturing the vibration motor.

FIG. 12 is a drawing which illustrates another example of the magnetic flux distribution of the magnet.

FIG. 14 is a vertical cross-sectional view of another preferred example of a vibration motor.

DETAILED DESCRIPTION OF THE PREFERRED EMBODIMENTS

Figure 3:
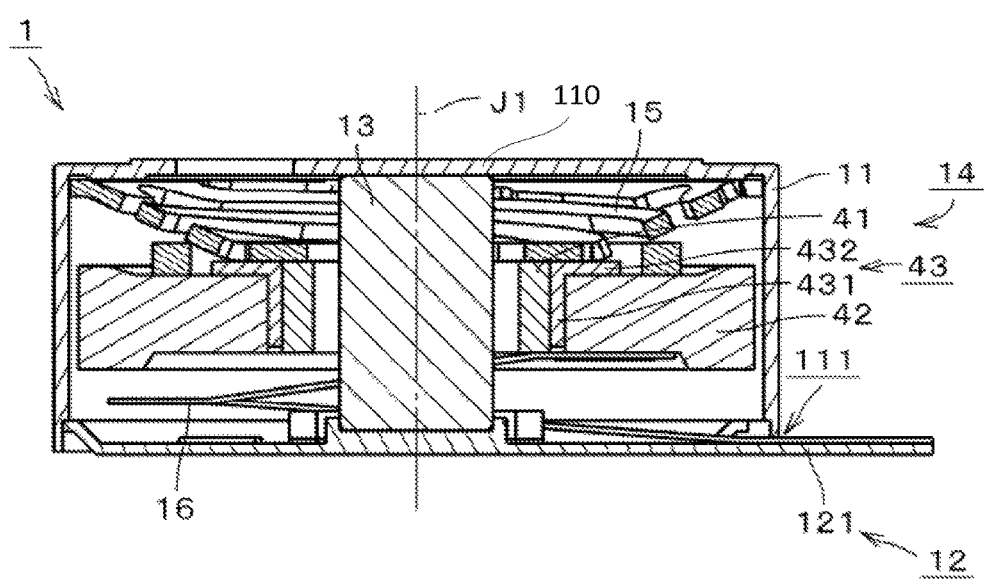
FIG. 3 is a vertical cross-sectional view of the vibration motor.

Herein, the upper side of FIG. 3 in the center axis J1 direction of the vibration motor 1 is simply referred to as "upper side" and the lower side thereof is referred to as "lower side." It is to be understood that the definition of these upper and lower sides is not intended to limit the positional relations or directions when the vibration motor is actually installed to any equipment. Further, a direction parallel to the center axis J1 is referred to as "vertical direction," a radial direction having its center on the center axis J1 is simply referred to as "radial direction," and a circumferential direction having its center on the center axis J1 is simply referred to as "circumferential direction."

Figure 1:
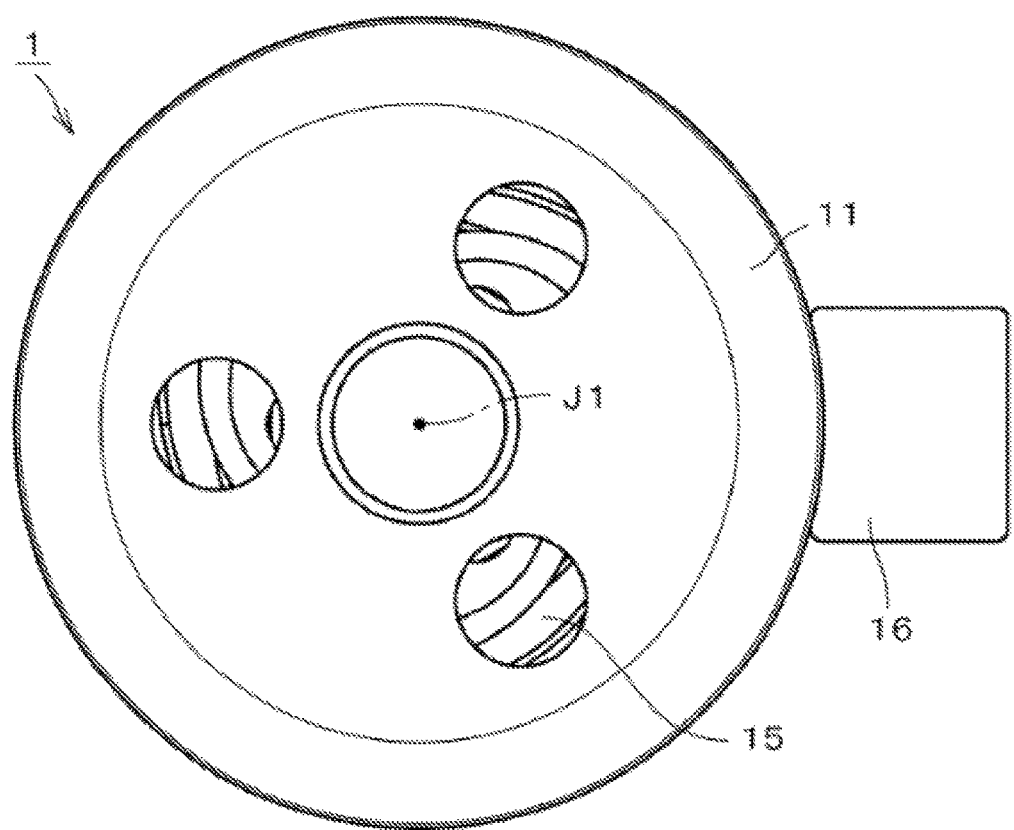
FIG. 1 is a top view of a vibration motor according to a preferred embodiment.
Figure 2:
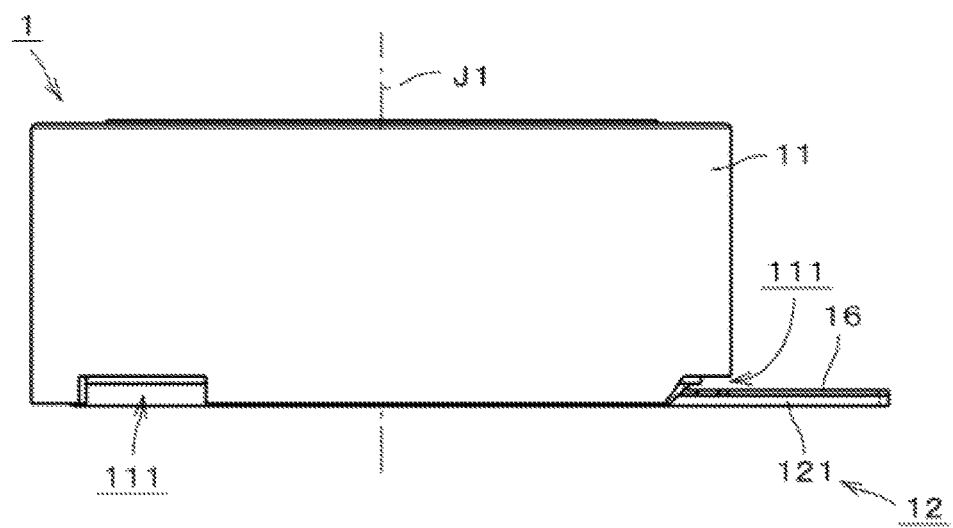
FIG. 2 is a side view of the vibration motor.
Figure 4:
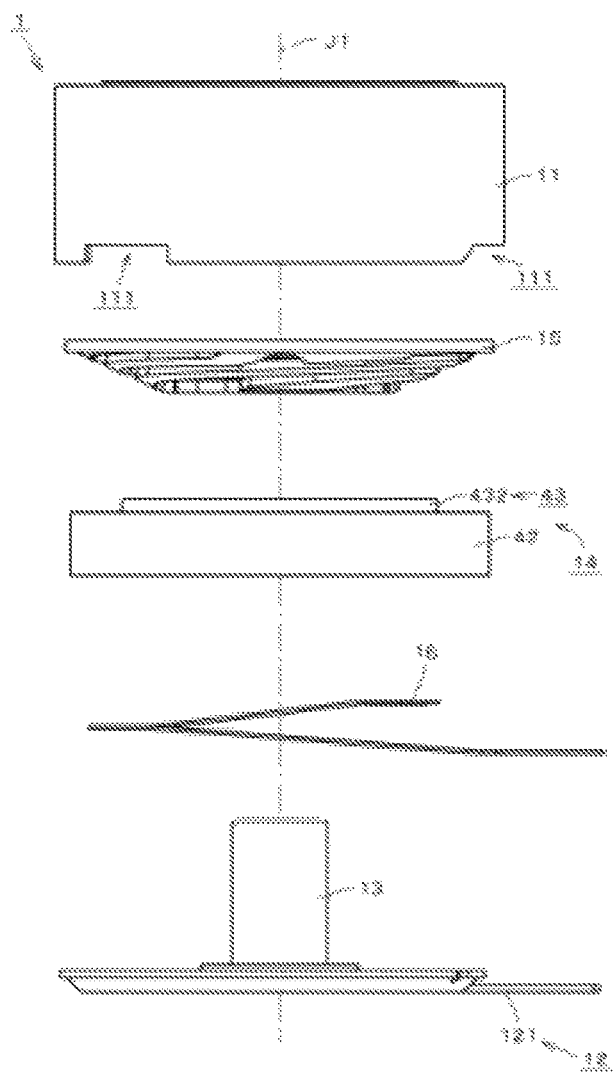
FIG. 4 is an exploded side view of the vibration motor.
Figure 5:
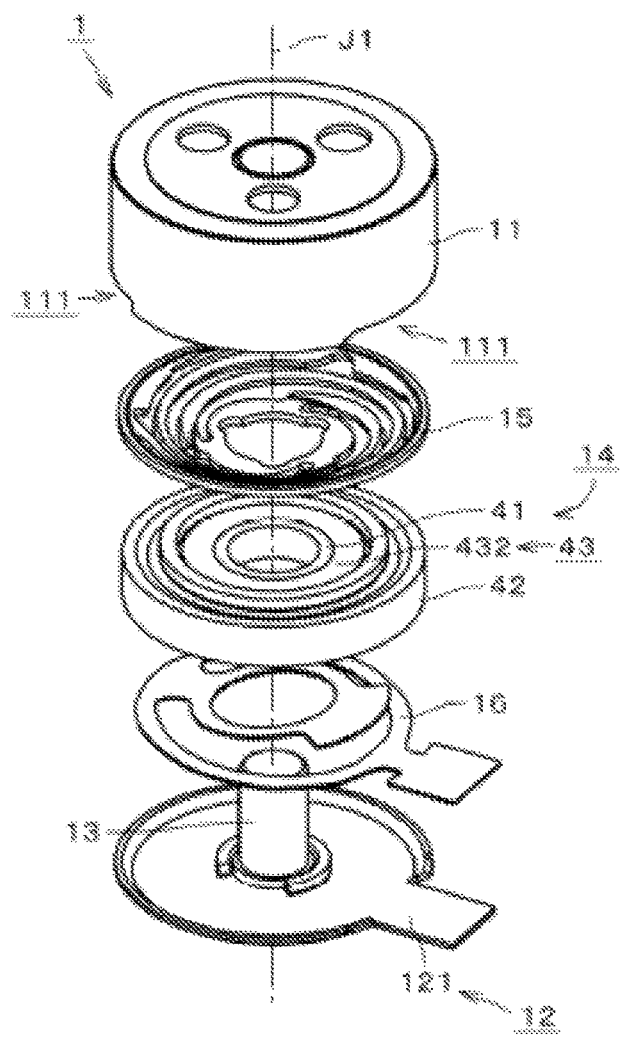
FIG. 5 is an exploded perspective view of the vibration motor.

FIG. 1 is a top view of a vibration motor 1 according to the first exemplary preferred embodiment of the present disclosure. FIG. 2 is a side view of the vibration motor 1. FIG. 3 is a vertical cross-sectional view of the vibration motor 1. FIG. 4 is an exploded side view of the vibration motor 1. FIG. 5 is an exploded perspective view of the vibration motor 1. In FIG. 3, a parallel diagonal line is omitted from the cross section details.

The vibration motor 1 is a Linear Resonant Actuator (LRA). The vibration motor 1 may be used as a silent notification device of mobile communication equipment of, for example, a cellular phone and the like.

The vibration motor 1 includes a cover portion 11 and a base portion 12. The cover portion 11 has a substantially cylindrical shape with a lid. The base portion 12 expands perpendicular to a vertical center axis J1. The cover portion 11 is fixed to the base portion 12. The base portion 12 closes an opening at a lower side of the cover portion 11. In this preferred embodiment, the cover portion 11 and the base portion 12 are made of metal. The cover portion 11 and the base portion 12 are connected by welding and the like. Further, the cover portion 11 and the base portion 12 may also be connected by other methods such as adhesion, caulking, and the like.

The base portion 12 includes a base protrusion 121 which extends in a substantially perpendicular direction to the center axis J1. The base protrusion 121 protrudes outward from the cover portion 11 in the radial direction. A plurality of grooves 111 which extend in the circumferential direction are formed at lower edges of the cover portion 11. The base protrusion 121 protrudes outward from one groove 111 in the radial direction. That is, a radially inner end portion of the base protrusion 121 is disposed inside the one groove 111. By providing the plurality of grooves 111 in the cover portion 11, positions of the base protrusion 121 and the one groove 111 can be easily aligned when the base portion 12 is fixed to the cover portion 11.

The vibration motor 1 includes a magnet 13, a vibrator portion 14, an elastic member 15, and a circuit board 16. The magnet 13 is a member of a substantially cylindrical shape having its center on the center axis J1. The magnet 13 is a single member, and is fixed to an upper side of the base portion 12 to extend in the vertical direction. For example, a lower end portion of the magnet 13 is fixed to a top surface of the base portion 12 by an adhesive and the like. Otherwise, an upper end portion of the magnet 13 is fixed to a bottom surface of a canopy portion 110 of the cover portion 11 by an adhesive, and the like. Further, the top surface of the base portion 12 is an inner surface of the base portion 12. The bottom surface of the canopy portion 110 of the cover portion 11 is an upper inner surface of the cover portion 11.

The vibrator portion 14 is a member of a substantially cylindrical shape having its center on the center axis J1. The vibrator portion 14 is disposed around the magnet 13 over its entire circumference. That is, at least a portion of the magnet 13 is disposed inside the vibrator portion 14. An inner diameter of the vibrator portion 14 is bigger than an outer diameter of the magnet 13. The vibrator portion 14 vibrates in the vertical direction along the magnet 13, without contacting the magnet 13. Upper and side portions of the magnet 13 and the vibrator portion 14 are covered by the cover portion 11.

The vibrator portion 14 includes a coil portion 41, a mass portion 42, and a yoke 43. The coil portion 41 is a member of a substantially cylindrical shape having its center on the center axis J1. The coil portion 41 faces the magnet 13 in the radial direction. An inner circumferential surface of the coil portion 41 faces an outer circumferential surface of the magnet 13 in the radial direction with a gap therebetween.

The yoke 43 includes a cylinder portion 431, and a flange portion 432. The cylinder portion 431 has a substantially cylindrical shape having its center on the center axis J1. The flange portion 432 is of a substantially ring shape having its center on the center axis J1. The flange portion 432 expands outward from an upper end portion of the cylinder portion 431 in the radial direction. The cylinder portion 431 and the flange portion 432 form a continuously connected member. The yoke 43 is disposed on a radially outer side of the coil portion 41. An inner circumferential surface of the cylinder portion 431 is fixed to an outer circumferential surface of the coil portion 41. The cylinder portion 431 is fixed to the coil portion 41 by, for example, an adhesive. The flange portion 432 may expand outward, for example, from a lower end portion of the cylinder portion 431 in the radial direction, or may not be necessarily required. Further, the cylinder portion 431 may be fixed to the coil portion 41 by means other than an adhesive, for example, welding and the like.

The mass portion 42 is a member of a substantially cylindrical shape having its center on the center axis J1. The mass portion 42 is a so-called weight. The mass portion 42 is disposed on a radially outer side of the cylinder portion 431 of the yoke 43 and the coil portion 41. An inner circumferential surface of the mass portion 42 is fixed to an outer circumferential surface of the cylinder portion 431 of the yoke 43. A bottom surface of the flange portion 432 of the yoke 43 is in contact with a top surface of the mass portion 42. The mass portion 42 is fixed to the yoke 43 by, for example, an adhesive or a double-sided adhesive tape, or by press-fitting. The mass portion 42 is indirectly fixed to the coil portion 41 through the yoke 43.

The elastic member 15 is a member which is elastically deformable in the vertical direction when a vertical force is applied thereto. The elastic member 15 is made of, for example, a plate shape spring material wound in a spiral form. The elastic member 15 is a volute spring which has a contour of, for example, a truncated cone. The elastic member 15 protrudes downward more and more as it goes toward its radially inner side. The elastic member 15 is disposed between an upper inner surface of the cover portion 11 and an upper portion of the vibrator portion 14. A top portion of the elastic member 15 is fixed to the upper inner surface of the cover portion. The top portion of the elastic member 15 is fixed to the cover portion 11 by, for example, welding. A bottom portion of the elastic member 15 is fixed to the vibrator portion 14. The bottom portion of the elastic member 15 is fixed to the top surface of the mass portion 42 by, for example, welding. Further, the bottom surface of the canopy portion 110 is the upper inner surface of the cover portion 11.

The circuit board 16 supplies current from a power source to the coil portion 41. In this preferred embodiment, the circuit board 16 is a Flexible Printed Circuit (FPC), which has flexibility. The circuit board 16 is a relatively thin and soft member. The circuit bard 16 is disposed between the base portion 12 and the vibrator portion 14, and fixed to the top surface of the base portion 12 and the bottom surface of the vibrator portion 14. The circuit board 16 is fixed to the base portion 12 and the vibrator portion 14 by, for example, an adhesive. Also, another type of circuit board, other than the Flexible Printed Circuit, may be used as the circuit board 16.

In the vibrator motor 1, when current is supplied to the coil portion 41 through the circuit board 16, a magnetic field is formed in the coil portion 41 and the yoke 43. By this magnetic field and a magnetic field of the magnet 13, a force to move the vibrator portion 14 in the vertical direction is generated. Hereinafter, the force to move the vibrator portion 14 in the vertical direction is referred to as "vibration force". Since the vibrator portion 14 is supported by the elastic member 15 in the vertical direction, it vibrates in vertical direction by the force received from the magnetic fields and a restoring force of the elastic member 15.

Figure 6:
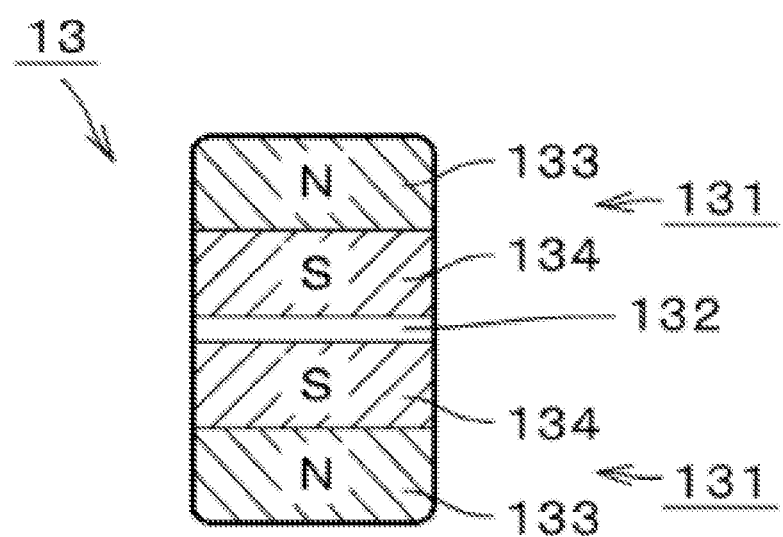
FIG. 6 is a drawing which illustrates an arrangement of magnetic poles in a magnet.

FIG. 6 is a drawing which illustrates an example of an arrangement of magnetic poles in the magnet 13. The magnet 13 includes a plurality of magnetic pole pairs 131 and a non-magnetic portion 132. The plurality of magnetic pole pairs 131 are arranged in the vertical direction. In the example shown in FIG. 6, the number of the plurality of magnetic pole pairs 131 which are included in the magnet 13 is two. Each of the magnetic pole pairs 131 has two magnetic poles 133, 134 which are adjacent to each other in the vertical direction. In FIG. 6, a parallel diagonal line is added to the magnetic poles 133, 134 for a better understanding of the drawing. The shapes of the magnetic poles 133, 134 and the non-magnetic portion 132 are not limited to those illustrated in FIG. 6, and may be variously modified.

The polarity of the magnetic poles 133 and the polarity of the magnetic poles 134 are different from each other. Hereinafter, the magnetic poles 133, 134 are also respectively referred to as "first magnetic poles 133" and "second magnetic poles 134". In the example shown in FIG. 6, the first magnetic poles 133 may be S-pole and the second magnetic poles 134 may be N-pole.

The non-magnetic portion 132 is disposed between each of the plurality of magnetic pole pairs 131 in the vertical direction. That is, each non-magnetic portion 132 is adjacent to the two magnetic pole pairs 131 in the vertical direction. The polarity of the two second magnetic poles 134 vertically adjacent to the non-magnetic portion 132 is identical. In the magnet 13 illustrated in FIG. 6, one non-magnetic portion 132 is disposed between the two magnetic pole pairs 131. Further, as described above, the two vertically adjacent second magnetic poles 134 to the non-magnetic portion 132 are S-pole. The two vertically adjacent second magnetic poles 134 to the non-magnetic portion 132 may be N-pole.

In the example shown in FIG. 6, vertical lengths of the two magnetic pole pairs 131 are substantially identical. The non-magnetic portion 132 is disposed at a substantially center portion of magnet 13 in the vertical direction. In the vibration motor 1 shown in FIG. 3, the center portion of the magnet 13 and the center portion of the coil portion 41 in the vertical direction are disposed to a substantially identical position in the vertical direction. That is, a vertical position of the non-magnetic portion 132 of the magnet 13 is substantially identical to a vertical position of the center portion of the coil portion 41. Accordingly, when current flows through the coil portion 41, a vibration force can be efficiently generated by the magnetic field of the magnet 13 and the coil portion 41. As a result, it is possible to increase the vibration force of the vibrator portion 14. Moreover, it is possible to reduce the current supplied to the coil portion 41, while maintaining the vibration force of the vibrator portion 14.

Figure 7:
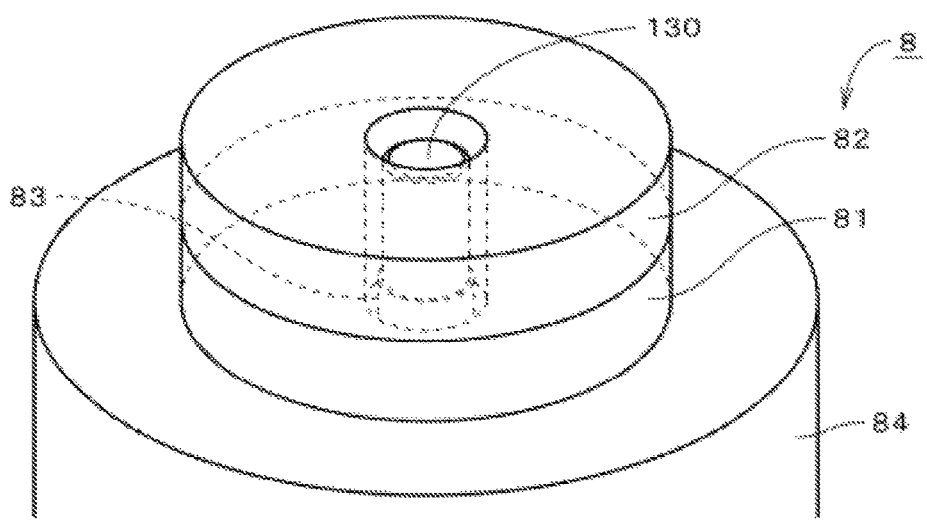
FIG. 7 is a perspective view of a magnetizing jig.
Figure 8:
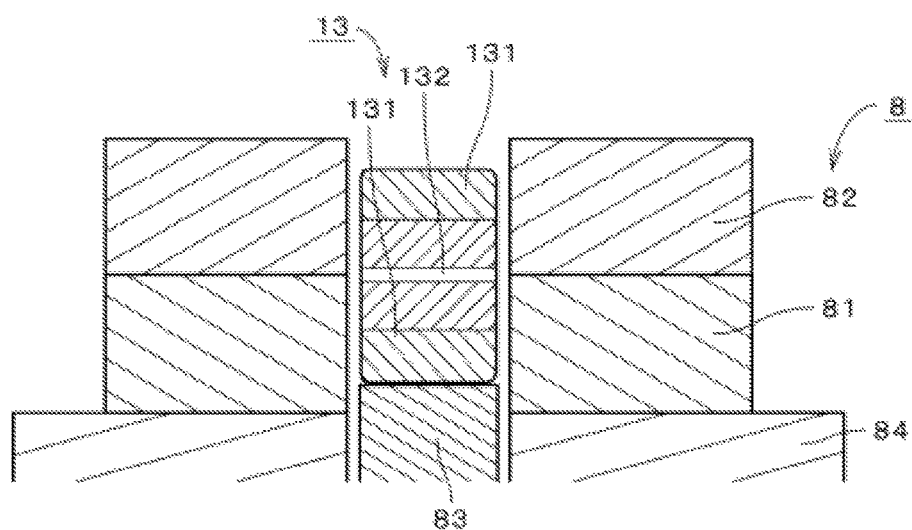
FIG. 8 is a vertical cross-sectional view of the magnetizing jig.

FIG. 7 is a perspective view of an example of a magnetizing jig 8 which magnetizes the magnet 13. FIG. 8 is a vertical cross-sectional view of the magnetizing jig 8 illustrated in FIG. 7. The magnetizing jig 8 includes a first magnetizing yoke 81, a second magnetizing yoke 82, a member support portion 83, and a magnetizing base 84. The first magnetizing yoke 81 and the second magnetizing yoke 82 are members having an identical shape, that is, substantially cylindrical shape. The first magnetizing yoke 81 and the second magnetizing yoke 82 are disposed on a top surface of the magnetizing base 84, one on top of the other in the vertical direction. The first magnetizing yoke 81 is disposed underneath the second magnetizing yoke 82. The member support portion 83 is a member of a substantially cylindrical shape. The member support portion 83 protrudes upward from the top surface of the magnetizing base 84. A portion of the member support portion 83 protruding from the magnetizing base 84 is inserted into a space on a radially inner side of the first magnetizing yoke 81. A top surface of the member support portion 83 is disposed to a lower position than the top surface of the first magnetizing yoke 81. The vertical position of the top surface of the member support portion 83 is adjustable. That is, the member support portion 83 is vertically movable relative to the first magnetizing yoke 81 and the second magnetizing yoke 82.

When magnetizing is performed by the magnetizing jig 8, first of all, an original member 130 of a substantially cylindrical shape, which is to become the magnet 13, is disposed in a space on a radially inner side of the first magnetizing yoke 81 and the second magnetizing yoke 82, as illustrated in FIG. 7. The original member 130 is supported from below by the member support portion 83. Further, the member support portion 83 is moved up and down as necessary, so that the vertical position of the original member 130 is adjusted. That is, a positional correction of the magnetizing jig 8 is performed. In the example shown in FIG. 7, the substantially vertical center portion of the original member 130 is disposed to a substantially identical position as the boundary between the first magnetizing yoke 81 and the second magnetizing yoke 82 in the vertical direction. In case the second magnetizing yoke 82 is separately disposed apart from the first magnetizing yoke 81 in the vertical direction, the boundary becomes a vertical center of a space between the top surface of the first magnetizing yoke 81 and the bottom surface of the second magnetizing yoke 82.

Then, by supplying current to the first magnetizing yoke 81 and the second magnetizing yoke 82, and generating a magnetic field, the magnet 13 which includes the plurality of magnetic pole pairs 131 and the non-magnetic portion 132 is formed, as shown in FIG. 8. In the magnet 13, a vertical center of the non-magnetic portion 132 and the boundary between the first magnetizing yoke 81 and the second magnetizing yoke 82 are disposed to a substantially identical position in the vertical direction. That is, when forming the magnet 13, the non-magnetic portion 132 takes the region which is vertically extended from its center on or near the boundary between the first magnetizing yoke 81 and the second magnetizing yoke 82. When forming the magnet 13, by correcting the magnetizing jig 8, and thereby adjusting the position of the member support portion 83 in the vertical direction, it is possible to adjust a vertical position of the non-magnetic portion 132 in the magnet 13.

Figure 9:
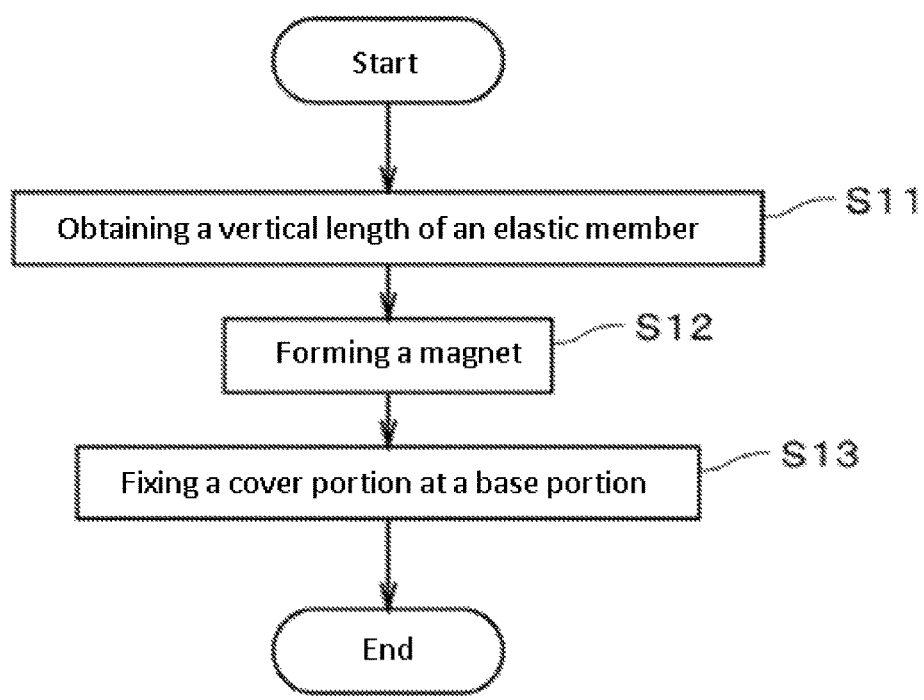
FIG. 9 is a drawing which illustrates a process flow for manufacturing the vibration motor.
Figure 1:
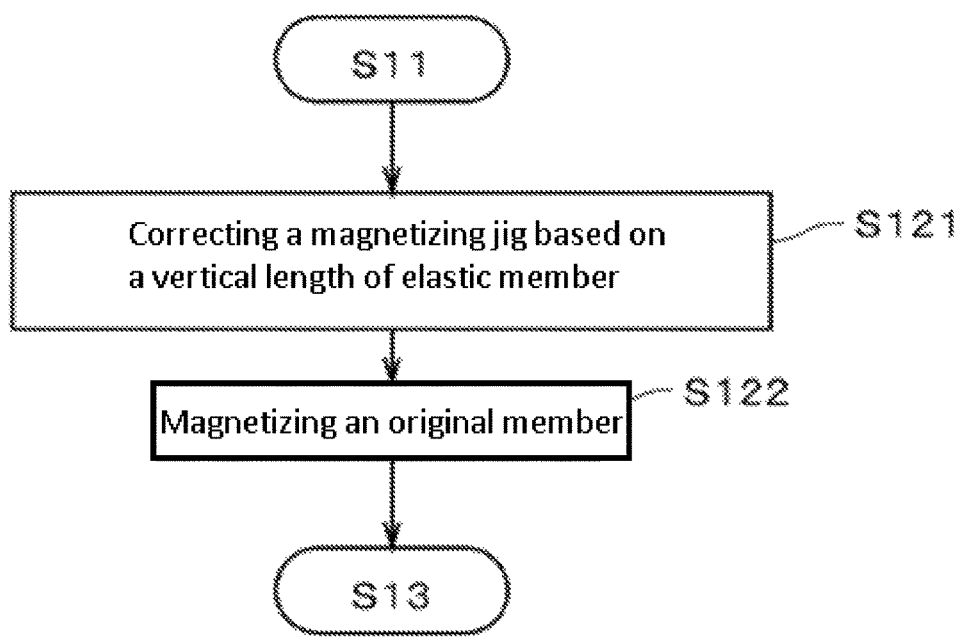

FIG. 9 is a drawing which illustrates an example of a process flow for manufacturing the vibration motor 1. When manufacturing the vibration motor 1, first of all, a vertical length of the elastic member 15 is acquired (Step S11). When a plurality of elastic members 15 is used in mass production of the vibration motor 1, their vertical lengths may slightly differ from the design value in each production lot, for example. In Step S11, for example, the vertical length of the elastic member 15 is measured, and the difference between the measured value and the design value is obtained. Further, in Step S11, the length of the elastic member 15 measured and stored in a memory unit in advance is read out from the memory unit.

Then, subsequent to Step S11, the magnet 13 is formed by magnetizing the original member 130 of the magnet 13 using the magnetizing jig 8, (Step S12). FIG. 10 is a drawing which illustrates the flow of Step S12 in detail. In Step S12, first, the magnetizing jig 8 is corrected based on the vertical length of the elastic member 15 obtained in Step S11. Specifically, the vertical position of the member support portion 83, which supports the original member 130 illustrated in FIG. 7, is adjusted based on the difference of the vertical length of the elastic member 15 from the design value.

For example, in case the vertical length of the elastic member 15 obtained in Step S11 is longer than the design value, the coil portion 41 will be disposed to a lower position than the design value in the vibration motor 1 after assembling. Therefore, as described above, in order for the vertical center portions of the non-magnetic portion 132 and the coil portion 41 to be disposed to a substantially identical position in the vertical direction, the vertical position of the non-magnetic portion 132 of the magnet 13 needs to be moved toward a lower position than the design value. Therefore, the member support portion 83 which supports the original member 130 is moved upward from a standard position. Accordingly, a portion of the original portion 130 facing the boundary between the first magnetizing yoke 81 and the second magnetizing yoke 82, that is, the portion which is to become the non-magnetic portion 132, is moved toward a lower end side of the original member 130 than the design value.

On the contrary, in case the vertical length of the elastic member 15 obtained in Step S11 is shorter than the design value, the member support portion 83, which supports the original member 130, needs to be moved downward from the standard position. Accordingly, a portion of the original portion 130 facing the boundary between the first magnetizing yoke 81 and the second magnetizing yoke 82, that is, the portion which is to become the non-magnetic portion 132, is moved toward an upper end side of the original member 130 than the design value.

Likewise, by correcting the magnetizing jig 8 based on the length of the elastic member 15 obtained in Step S11, a vertical position of a portion of the original member 130 which is to become the non-magnetic portion 132 is adjusted (step S121). Further, subsequent to Step S121, the magnet 13 is formed by magnetizing the original member 130 using the corrected magnetizing jig 8 (step S122).

Then, the elastic member 15 and the vibrator portion 14 are attached to the inner side of the cover portion 11. The circuit board 16 is fixed to the vibrator portion 14. The magnet 13 formed in Step S12 is fixed to the base portion 12. Further, upper and side portions of the elastic member 15, the vibrator portion 14, and the magnet 13 are respectively covered by the cover portion 11, and the cover portion 11 is fixed to the base portion (Step S13). Fixing the cover portion 11 to the base portion 12 in Step S13 is, of course, performed after Step S12. However, attaching the elastic member 15 and the vibrator portion 14 to the cover portion 11 may be performed simultaneously with Step S12 or even before Step S12, as long as it is performed after Step S11.

As described above, the vibration motor 1 is provided with the magnet 13 which is a single member. Accordingly, it is possible to reduce the number of components, when compared to a vibration motor which is provided with a plurality of magnets. Further, with this structure, it is possible to simplify the process for fixing the magnet 13 when manufacturing the vibration motor 1. Moreover, when fixing the magnet 13, it is unnecessary to consider the dislocation of the magnet which may be caused by a magnetic repulsive force generated between a plurality of magnets, and it is therefore possible to further simplify the process for fixing the magnet 13.

Figure 11:
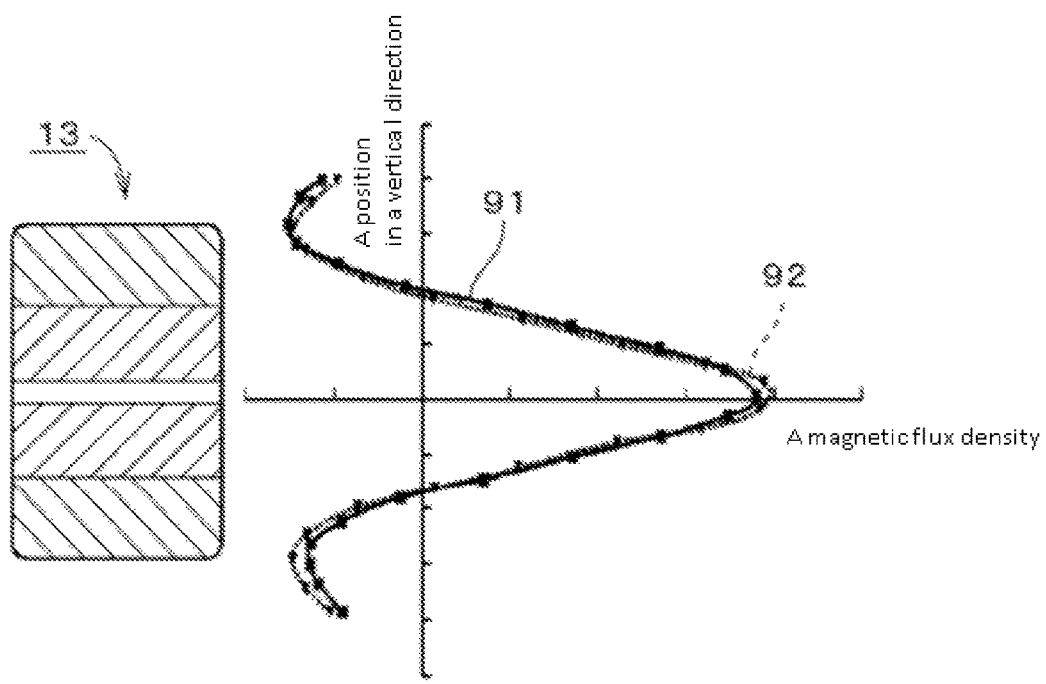
FIG. 11 is a drawing which illustrates a magnetic flux distribution of the magnet.
Figure 1:
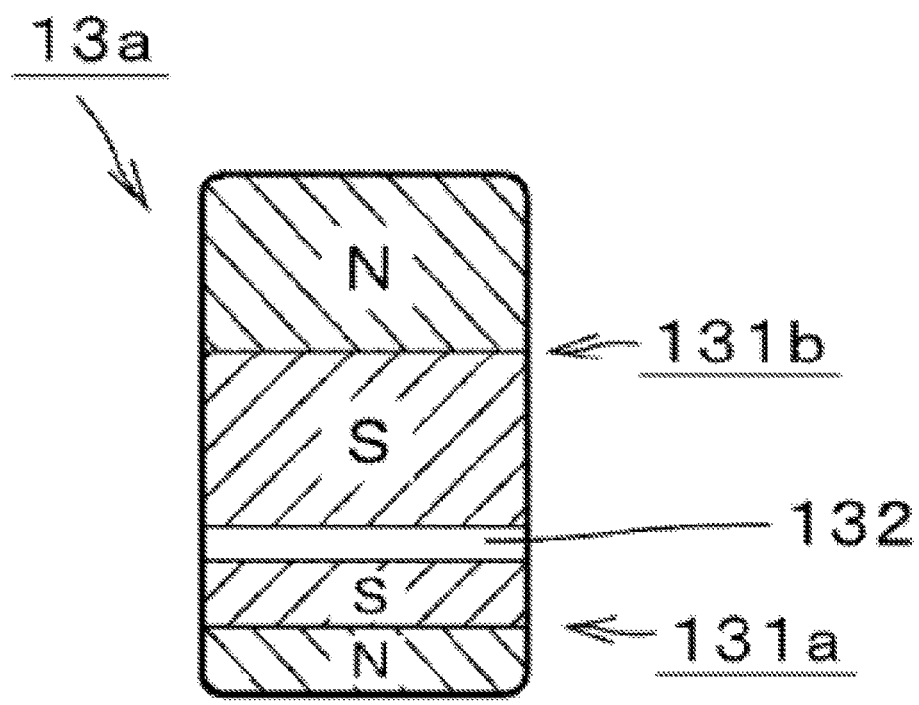

As described above, the magnet 13 includes the plurality of magnetic pole pairs 131 each of which has the two vertically adjacent magnetic poles 133, 134 having different polarity from each other, and which are arranged in the vertical direction, and the non-magnetic portion 132 which is disposed between each of the plurality of magnetic pole pairs in the vertical direction, where the polarity of the two vertically adjacent magnetic poles 134 is identical. Accordingly, unlike the magnet in which magnetic poles in odd number are magnetized in its lateral surface, it is possible to enlarge the magnetic flux loops generated from the center portion of the lateral surface of the magnet toward a radially outer side. For this reason, the amount of the magnetic flux which vertically passes through the coil portion 41 is increased, so that the vibration force gets stronger, when compared to the magnet in which magnetic poles in odd number are magnetized in the lateral surface. As a result, with the vibration motor 1, as illustrated with a solid line 91 in FIG. 11, it is possible to achieve a magnetic flux distribution which is identical to the magnetic flux distribution (shown with a broken line 92) of a case in which a plurality of magnets are arranged in the vertical direction. A vertical axis of FIG. 11 shows a vertical position of the magnet 13 which is shown together on the left side, and a horizontal axis shows a density of the magnetic flux.

AS described above, with the vibration motor 1, it is possible to simplify the structure and the manufacturing process of the vibration motor 1 without reducing the vibration force, when compared to a vibration motor in which a plurality of magnets are arranged in the vertical direction.

AS described above, in the magnet 13 of the vibration motor 1, the number of the plurality of magnetic pole pairs 131 is two. Accordingly, it is possible to reduce the length of the magnet 13 in the vertical direction. Therefore, the magnet 13 is particularly suitable for a small vibration motor 1.

When manufacturing the vibration motor 1, a vertical length of the elastic member 15 is obtained (Step S11), and after Step S11, by magnetizing the original member 130 using the magnetizing jig 8, the magnet 13 is formed (Step S12). In Step S12, first, by correcting the magnetizing jig 8 based on the vertical length of the elastic member 15 which was obtained in Step S11, the vertical position of the portion which is to become the non-magnetic portion 132 is adjusted (Step S121). Further, after Step S121, by magnetizing the original member 130 using the corrected magnetizing jig 8, the magnet 13, which includes the plurality of magnetic pole pairs 131 and the non-magnetic portion 132, is formed (Step S122).

Accordingly, in the vibration motor 1, even if the vertical length of the elastic member 15 is different from the design value, it is possible to prevent the vertical position of the non-magnetic portion 132 relative to the coil portion 41 from being deviated. With this, regardless of the vertical length of the elastic member 15, the vertical center portion of the non-magnetic portion 132 and the coil portion 41 is disposed to a substantially identical position in the vertical direction. As a result, it is possible to effectively generate a vibration force by the magnetic field of the magnet 13 and the coil portion 41.

Further, in this preferred embodiment, a correction of the magnetizing jig 8 is performed based on the vertical length of the elastic member 15. However, the correction of the magnetizing jig 8 may be performed based on factors other than the vertical length of the elastic member 15. For example, after the elastic member 15 and the vibrator portion 14 are attached to the cover portion 11, a position of the vertical center portion of the coil portion 41 relative to the cover portion 11 may be measured, and the magnetizing jig 8 may be corrected based on this relative position.

In the vibration motor 1, the non-magnetic portion 132 does not necessarily need to be disposed at the substantially center portion of the magnet 13 in the vertical direction. For example, instead of the magnet 13, a magnet 13a having an arrangement of magnetic poles illustrated in FIG. 12 may be provided to the vibration motor 1. In the magnet 13a, a plurality of magnetic pole pairs includes a first magnetic pole pairs 131a and a second magnetic pole pairs 131b. The first magnetic pole pairs are disposed on the lowermost side of the magnet 13a. The second magnetic pole pairs 131b are disposed on the first magnetic pole pairs 131a. A vertical length of the second magnetic pole pairs 131b is longer than a vertical length of the first magnetic pole pairs 131a. Accordingly, the non-magnetic portion 132, which is disposed between the first magnetic pole pairs 131a and the second magnetic pole pairs 131b, is disposed to a lower position than the center portion of the magnet 13a.

For this reason, in the magnet 13a, when compared to the magnet 13 illustrated in FIG. 6, while maintaining a substantially identical amount of the magnetic flux which is generated from the magnet 13a toward the radial direction, an amount of the magnetic flux generated from the magnet 13a to a downward direction is reduced. Therefore, in the vibration motor 1 which is provided with the magnet 13a, it is possible to reduce the amount of the magnetic flux which passes through the base portion 12 from the magnet 13a to a downward direction while maintaining a substantially identical vibration force. That is, in the vibration motor 1 which is provided with the magnet 13a, it is possible to reduce a magnetic flux leakage which occurs from the base portion 12 to a downward direction. For example, it is possible to reduce the magnetic flux leakage, which is about 300 mT (milli tesla) when using the magnet 13, to about 3 mT by using the magnet 13a.

In the vibration motor 1 which is provided with the magnet 13a, in order to reduce the magnetic flux leakage which occurs from the base portion 12, it is unnecessary to manufacture the base portion 12 from a particular material and it is also unnecessary to install a new member at the base portion 12, it is therefore possible to inhibit the manufacturing cost of the vibration motor 1 from being increased.

Figure 13:
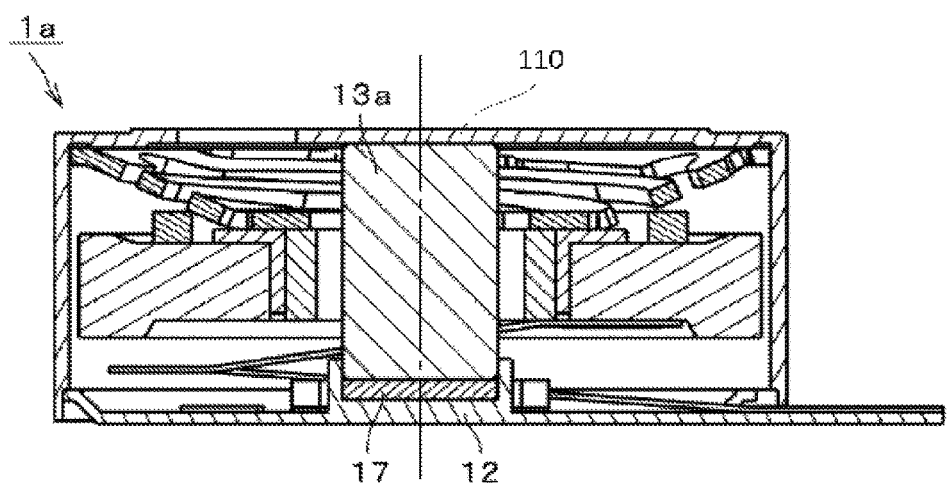
FIG. 13 is a vertical cross-sectional view of another preferred example of a vibration motor.
Figure 1:
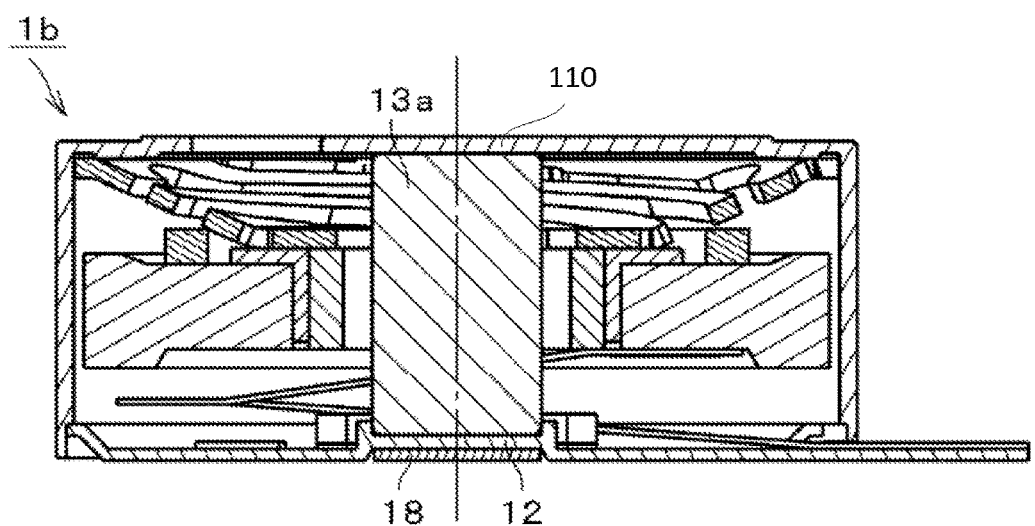

FIG. 13 is a vertical cross-sectional view which illustrates another preferred example of the vibration motor. In the vibration motor illustrated in FIG. 13, the magnet 13a illustrated in FIG. 12 is fixed to the base portion 12 through a spacer 17. Accordingly, since a distance between the lower end of the magnet 13a and the base portion 12 is increased, it is possible to further reduce the magnetic flux leakage which occurs from the base portion 12. For example, by installing the spacer 17, it is possible to reduce the magnetic flux leakage which occurs from the base portion 12 from about 3 mT to about 2 mT. The spacer 17 may be made of a magnetic material or a non-magnetic material. In case the spacer 17 is formed of a magnetic material, it is possible to further reduce the magnetic flux leakage which occurs from the base portion 12 by a magnetic film of the spacer 17. The spacer 17 may be formed between the magnet 13 and the base portion 12 in the vibration motor 1 which is provided with the magnet 13 illustrated in FIG. 6.

FIG. 14 is a vertical cross-sectional view which illustrates another preferred example of the vibration motor. In the vibration motor 1b illustrated in FIG. 14, the magnet 13a is directly fixed to an inner surface of the base portion 12 (that is, the top surface of the base portion 12). Further, in the base portion 12 to which the magnet 13a is directly fixed, a magnetic shield portion 18 is disposed at a position on an outer surface which vertically overlaps with the magnet 13a. The magnetic shield portion 18 is formed of a magnetic material. It is possible to further reduce the magnetic flux leakage which occurs from the base portion 12 by a magnetic film of the magnetic shield portion 18. The magnetic shield portion 18 may be formed at a bottom surface which is an outer surface of the base portion 12 of the vibration motor 1 which is provided with the magnet 13 illustrated in FIG. 6. That is, the magnetic shield portion 18 may be disposed axially at a lower side of the magnet 13a with the base portion 12 interposed therebetween. That is, disposed at the bottom surface of the base portion, the magnetic shield portion 18 may be disposed axially at an opposite side of the magnet 13a with the base portion 12 interposed therebetween.

Figure 15:
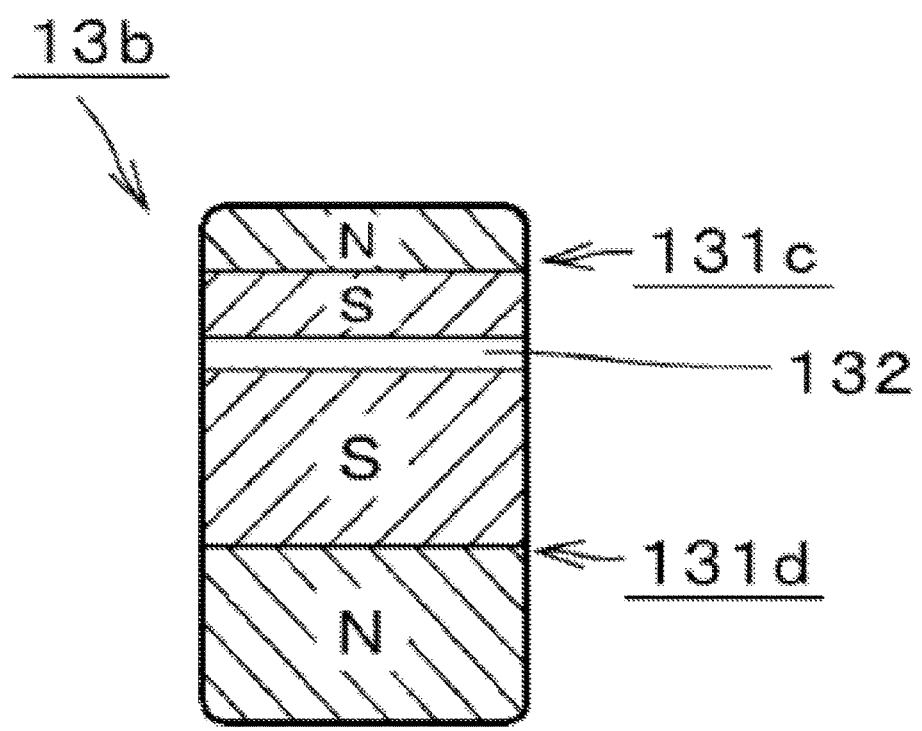
FIG. 15 is a drawing which illustrates another example of the arrangement of magnetic poles in the magnet.

In the vibration motor 1 illustrated in FIG. 3, instead of the magnet 13, a magnet 13b having an arrangement of magnetic poles illustrated in FIG. 15 may be provided. In the magnet 13b, the plurality of magnetic pole pairs includes first magnetic pole pairs 131c and second magnetic pole pairs 131d. The first magnetic pole pairs 131c are disposed on the uppermost side of the magnet 13a. The second magnetic pole pairs 131d are disposed underneath the first magnetic pole pairs 131c. A vertical length of the second magnetic pole pairs 131d is longer than a vertical length of the first magnetic pole pairs 131c. Accordingly, the non-magnetic portion 132, which is disposed between the first magnetic pole pairs 131c and the second magnetic pole pairs 131d, is disposed to an upper position than the center portion of the magnet 13b.

For this reason, in the magnet 13b, when compared to the magnet 13 illustrated in FIG. 6, an amount of the magnetic flux generated from the magnet 13b to an upward direction is reduced, while maintaining a substantially identical amount of the magnetic flux which is generated from the magnet 13b toward the radial direction. Therefore, with the vibration motor 1 which is provided with the magnet 13b, it is possible to reduce an amount of the magnetic flux which passes through the canopy portion 110 of the cover portion 11 from the magnet 13b to an upward direction, while maintaining a substantially identical vibration force. That is, in the vibration motor 1 which is provided with the magnet 13b, it is possible to reduce a magnetic flux leakage which occurs from the canopy portion 110 of the cover portion 11 to an upward direction. In the vibration motor 1 provided with the magnet 13b, it is unnecessary to manufacture the cover portion 11 from a particular material and install a new member at the cover portion 11 in order to reduce the magnetic flux leakage from the cover portion 11. As a result, it is possible to inhibit the manufacturing cost of the vibration motor 1 from being increased.

Figure 16:
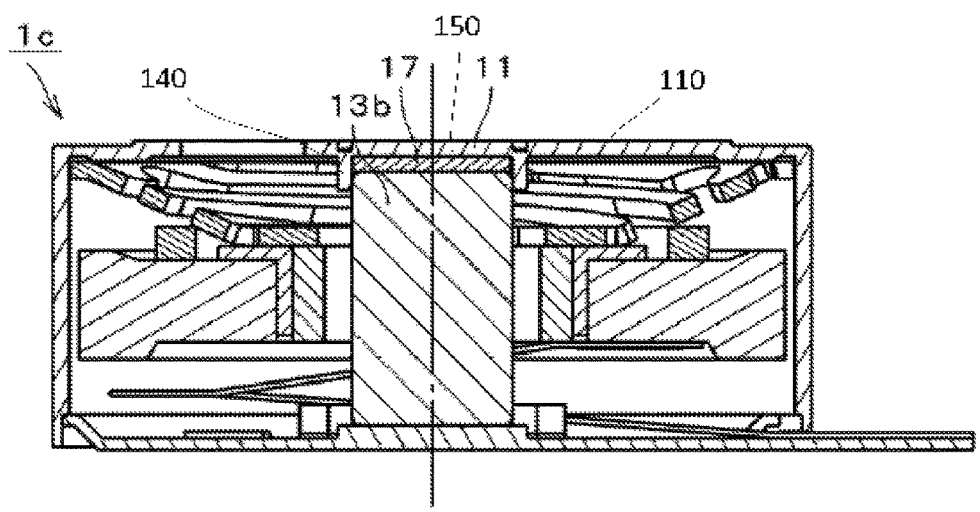
FIG. 16 is a vertical cross-sectional view of another preferred example of a vibrator portion motor.

FIG. 16 is a vertical cross-sectional view which illustrates another preferred example of the vibration motor. In the vibration motor 1c illustrated in FIG. 16, the magnet 13b illustrated in FIG. 15 is fixed to the cover portion 11 with the spacer 17 interposed therebetween. Accordingly, since the distance between an upper end of the magnet 13b and the canopy portion 110 of the cover portion 11 is increased, it is possible to further reduce the magnetic flux leakage from the canopy portion 110 of the cover portion 11. The spacer 17 may be made of a magnetic material or a non-magnetic material. In case the spacer 17 is formed of a magnetic material, it is possible to further reduce the magnetic flux leakage which occurs from the base portion 12 by a magnetic film of the spacer 17. The spacer 17 may be formed between the magnet 13 and the cover portion 11 of the vibration motor 1 which is provided with the magnet 13 illustrated in FIG. 6. Further, the magnetic shield portion 18 may be disposed axially at lower side of the magnet 13b with the cover portion 11 interposed therebetween. That is, the magnetic shield portion 18 may be disposed on a top surface of the cover portion 11, and on an axially opposite side of the magnet 13b. Further, in FIG. 16, a cylindrical portion 140, which extends axially toward a lower side, is disposed to a bottom surface of the canopy portion 110. At least a portion of an upper end portion of the magnet 13b is disposed inside the cylindrical portion 140. Further, the magnetic shield portion 18 is disposed inside the cylindrical portion 140.

Figure 17:
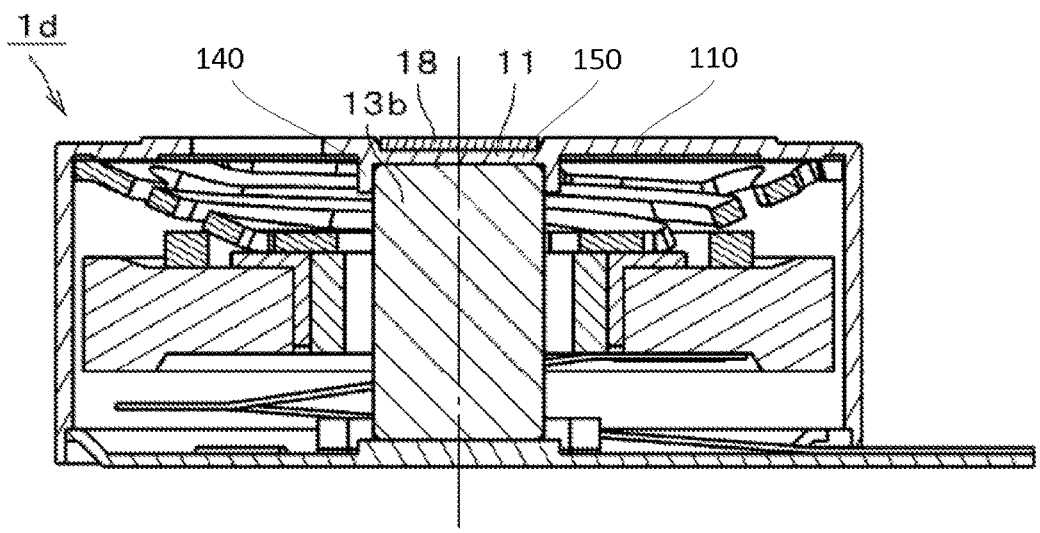
FIG. 17 is a vertical cross-sectional view of another preferred example of a vibrator portion motor.

FIG. 17 is a vertical cross-sectional view which illustrates another preferred example of the vibration motor. In the vibration motor 1d illustrated in FIG. 17, the magnet 13b illustrated in FIG. 15 is directly fixed to an upper inner surface of the cover portion 11 (that is, a bottom surface of the cover portion 11). Like the structure illustrated in FIG. 16, the cylindrical portion 140 is disposed at a substantially center portion of the bottom surface of the cover portion 11. At least a portion of the magnet 13b is disposed inside the cylindrical portion 140. In the cover portion 11 to which the magnet 13b is directly fixed, the magnetic shield portion 18 is disposed to a position on an outer surface which vertically overlaps with the magnet 13b. The magnetic shield portion 18 is formed of a magnetic material. It is possible to further reduce the magnetic flux leakage which occurs from the canopy portion 110 of the cover portion 11 by a magnetic film of the magnetic shield portion 18. The magnetic shield portion 18 may be formed at an top surface which is an outer surface of the cover portion 11 of the vibration motor 1 which is provided with the magnet 13 illustrated in FIG. 6. Further, a hollow portion 150, which is hollowed toward an axially lower side, may be disposed to a top surface of the canopy portion 110. Preferably, the magnetic shield portion 18 is disposed inside the hollow portion 150. It may be preferable to dispose an upper portion of the magnetic shield portion 18 to a position having an identical height with opening edges of the hollow portion 150 or at an axially lower position than the opening edges of the hollow portion 150 may be preferable. Further, the opening edges of the hollow portion 150 are disposed on an axially opposite side of the cylindrical portion 140.

Various modifications can be applied to the vibration motors 1, 1a, 1b, 1c, 1d.

In the magnets 13, 13a, 13b, three or more magnetic pole pairs 131 may be arranged in the vertical direction. In this case, the number of non-magnetic portion 132, which is disposed between the vertically adjacent magnetic pole pairs 131, is at least two.

In the vibration motor 1 illustrated in FIG. 3, the spacer 17 may be provided to both between the magnet 13 and the base portion 12, and between the magnet 13 and the cover portion 11. Accordingly, it is possible to reduce a magnetic flux leakage which occurs from the base portion 12 and a magnetic flux leakage which occurs from the canopy portion 110 of the cover portion 11. Further, the magnetic shield portion 18 may be disposed to a position on both an outer surface of the base portion 12 and an outer surface of the canopy portion 110 of the cover portion 11 which vertically overlaps with the magnet 13. Accordingly, it is possible to reduce both a magnetic flux leakage which occurs from the base portion 12 and a magnetic flux leakage which occurs from the canopy portion 110 of the cover portion 11. This identically applies to the vibration motor 1 which is provided with the magnet 13a or the magnet 13b.

In the vibration motor 1a illustrated FIG. 13, the magnetic shield portion 18 may be disposed to a position on an outer surface of canopy portion 110 of the cover portion 11 which vertically overlaps with the magnet 13a. In the vibration motor 1b illustrated FIG. 14, the spacer 17 may be formed between the magnet 13a and the cover portion 11. Accordingly, it is possible to reduce both of a magnetic flux leakage which occurs from the base portion 12 and a magnetic flux leakage which occurs from the canopy portion 110 of the cover portion 11. This identically applies to the vibration motors 1a, 1b which are provided with the magnet 13 or the magnet 13b.

In the vibration motor 1c illustrated FIG. 16, the magnetic shield portion 18 may be disposed to a position on an outer surface of the base portion 12 which vertically overlaps with the magnet 13b. In the vibration motor 1d illustrated FIG. 17, the spacer 17 may be provided between the magnet 13b and the base portion 12. Accordingly, it is possible to reduce both of a magnetic flux leakage which occurs from the base portion 12 and a magnetic flux leakage which occurs from the canopy portion 110 of the cover portion 11. This identically applies to the vibration motors 1c, 1d which are provided with the magnet 13 or the magnet 13a.

The structures and the shapes of the vibrator portion 14 and the elastic member 15 may be properly changed. For example, in the vibrator portion 14, the coil portion 41 may be directly fixed to an inner circumferential surface of the mass portion 42 with the yoke 43 omitted.

Each member in the vibration motors 1, 1a, 1b, 1c, 1d may be indirectly attached or fixed. For example, the elastic member 15 may be fixed to the cover portion 11 and the cover portion 11 may be fixed to the base portion 12 by interposing another member therebetween.

The configurations in the preferred embodiments and each modification may be appropriately combined with each other as long as contradiction does not occur.

The vibration motor 1 according to the present disclosure can be used as a vibration motor for various purposes. Preferably, it can be used, for example, as a silent notification device of mobile communication equipment of a cellular phone and the like.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor, comprising:
   a base portion which expands perpendicular to a vertical center axis;
   a magnet which is a single monolithic member made of a single magnetic material fixed to an upper side of the base portion to extend in a vertical direction;
   a vibrator portion which is disposed around the magnet and vibrates in the vertical direction;
   a cover portion which is fixed to the base portion and covers upper and side portions of the magnet and the vibrator portion; and an elastic member which is disposed between an upper inner surface of the cover portion and a top portion of the vibrator portion; wherein the vibrator portion includes:

a coil portion which faces the magnet in a radial direction; and a mass portion which is fixed to the coil portion, and the magnet includes:

a plurality of magnetic pole pairs which are arranged in the vertical direction and each of which has two vertically adjacent magnetic poles having a different polarity from each other; and a non-magnetic portion which is disposed between each of the plurality of magnetic pole pairs in the vertical direction and in which the polarity of magnetic poles on both sides vertically adjacent to the non-magnetic portion is identical.

2. The vibration motor according to claim 1, wherein a number of the plurality of magnetic pole pairs is two.

3. The vibration motor according to claim 1, wherein the plurality of magnetic pole pairs includes:

a first magnetic pole pair which is disposed on a lowermost side or an uppermost side of the magnet; and a second magnetic pole pair where its vertical length is longer than that of the first magnetic pole pair.

4. The vibration motor according to claim 1, wherein the magnet is fixed to the base portion or the cover portion through a spacer.

5. The vibration motor according to claim 1, wherein the magnet is directly fixed to an inner surface of the base portion or an upper inner surface of the cover portion, and in the base portion or the cover portion to which the magnet is directly fixed, a magnetic shield portion is disposed to a position on an outer surface which vertically overlaps with the magnet.

6. The vibration motor according to claim 5, wherein a hollow portion which is hollowed toward an axially lower side is disposed to a top surface of the cover portion, and the magnetic shield portion is disposed in the hollow portion.

7. The vibration motor according to claim 6, wherein an upper portion of the magnetic shield portion is disposed to a position having an identical height with opening edges of the hollow portion or at an axially lower position than the opening edges of the hollow portion.

8. The vibration motor according to claim 1, wherein the coil portion is directly fixed to an inner circumferential surface of the mass portion.

9. A silent notification device, comprising the vibration motor described in claim 1.

10. Mobile communication equipment, comprising the silent notification device described in claim 9.

11. A method of manufacturing the vibration motor of claim 1, the method comprising:

a) obtaining a vertical length of the elastic member;

b) subsequent to process a), by magnetizing an original member of the magnet using a magnetizing jig, forming the magnet including a plurality of magnetic pole pairs which are arranged in the vertical direction and each of which has two vertically adjacent magnetic poles having a different polarity from each other, and a non-magnetic portion which is disposed between each of the plurality of magnetic pole pairs in the vertical direction and in which the polarity of magnetic poles on both sides vertically adjacent to the non-magnetic portion is identical; and c) fixing the cover portion to the base portion while covering upper and side portions of the elastic member, the vibrator portion, and the magnet, and the process b) includes the processes of:

b1) adjusting a vertical position of a portion which is to become the non-magnetic portion by correcting the magnetizing jig based on the length of the elastic member in the vertical direction obtained in the process a); and b2) subsequent to process b1), forming the magnet by magnetizing the original member, using the corrected magnetizing jig.

12. A silent notification device, comprising a motor manufactured by the manufacturing method of the vibration motor described in claim 11.

13. Mobile communication equipment, comprising the silent notification device described in claim 12.

* * * * *